(No Model.)
G. W. SCHEUING.
PISTON ROD PACKING.
No. 342,391. Patented May 25, 1886.
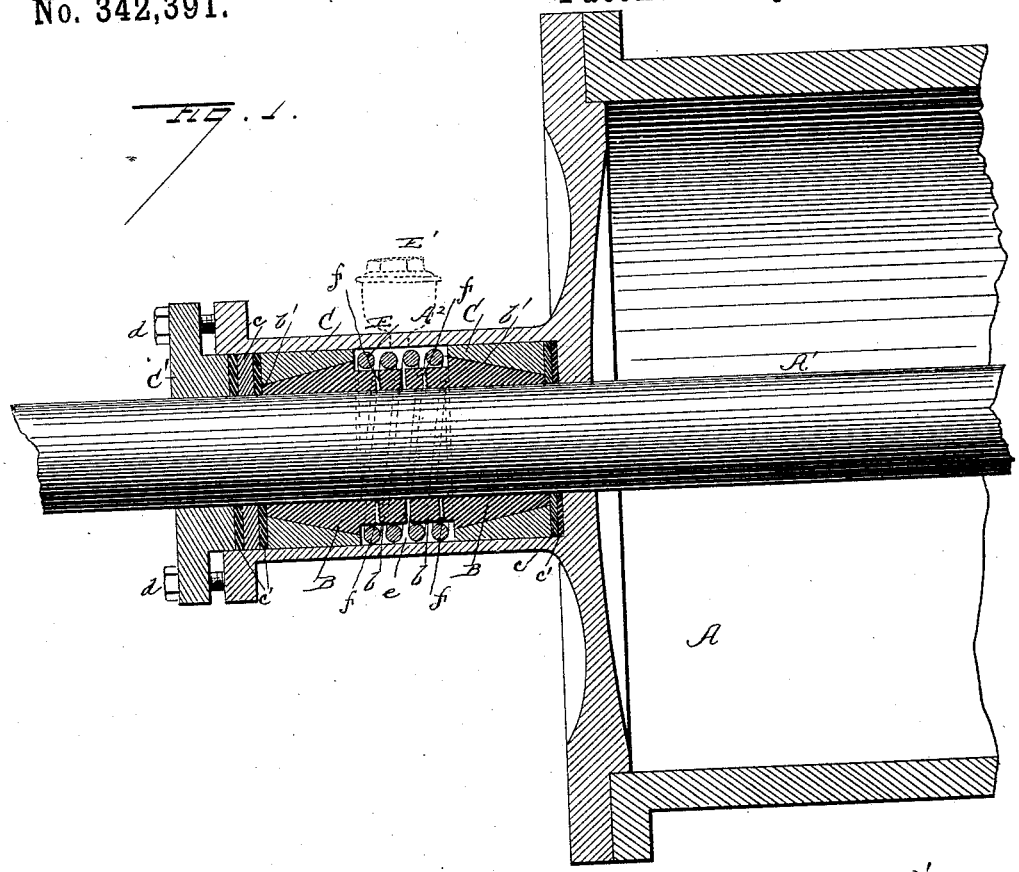
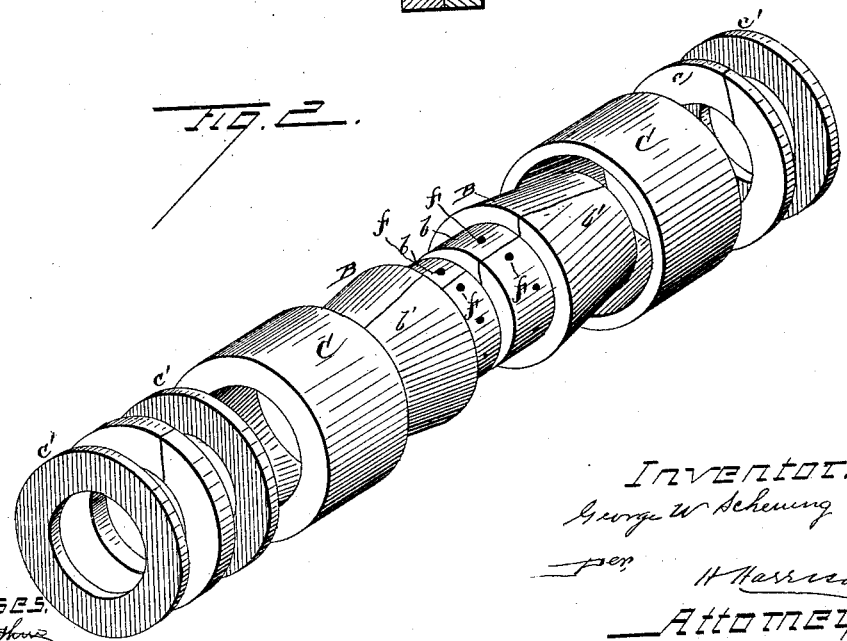

UNITED STATES PATENT OFFICE.

GEORGE W. SCHEUING, OF CHICAGO, ILLINOIS.

PISTON-ROD PACKING.

SPECIFICATION forming part of Letters Patent No. 342,391, dated May 25, 1886.

Application filed October 1, 1885. Serial No. 178,698. (No model.)

*To all whom it may concern:*

Be it known that I, GEORGE W. SCHEUING, a citizen of the United States, residing at Chicago, in the county of Cook and State of Illinois, have invented certain new and useful Improvements in Piston-Rod Packing, of which the following is a specification, to wit:

This invention relates to piston-rod packing; and it consists in the peculiar construction and arrangement of the same, substantially as will be hereinafter more fully set forth, and pointed out in the claims.

In order to enable others skilled in the art to which my invention appertains to make and use the same, I will now proceed to describe its construction and operation, referring to the accompanying drawings, in which—

Figure 1 is a longitudinal section of a steam-cylinder with my packing on the piston, and Fig. 2 is a perspective view of the various parts composing my packing.

A represents a steam or other cylinder; A', a piston-rod, and A² the stuffing or packing box attached to or forming a part of the cylinder-head through which the piston-rod passes in its travel. Upon the piston-rod, within the packing-box, are placed two rings of soft metal, B, or other suitable packing. These rings are formed on their abutting ends with a smaller or shouldered portion, b, and from this point or shoulder they are turned down to form a conical portion, b', with the smaller end farthest from the center of the packing-box. Around the conical portions of the packing-rings B are placed brass rings C, the inner sides of which are also conical to fit the surface of the packing-rings. As seen in Fig. 2, these brass rings are formed whole, while the packing-rings B are split upon one side, forming an open ring, which is pressed together around the piston-rod as the brass adjusting-rings are forced together, and thus a steam and oil tight packing obtained, which fits closely on the rod at all times.

At the inner end of the packing-box, behind the packing-rings, are placed a lead ring, c, and a rubber one, c', while at the outer end of the box are placed two rubber rings c' with a lead ring c between them, as shown clearly in the drawings. Against these outer rings the gland C' is drawn down by bolts d, as usual. The lead rings c are also split open on one side, as shown.

The abutting shouldered ends of the packing-rings B form an annular recess, e, around the box A², in which is placed a spiral spring, E, the ends of which bear against the rings B C, and force them toward the opposite ends of the packing-box, and an oil-cup, E', is secured on the side of the box A², and communicating with the annular space within the box, as shown.

In practice the various parts are placed in the box, as shown, and the gland screwed down till the spring E is compressed and the shouldered ends of the packing-rings brought nearly or quite in contact. This pressure draws the split packing-rings and lead rings together around the rod, and the rubber rings are expanded to form a joint that prevents the escape of oil. These rubber rings of course soon become hard and useless, but not until they have served their purpose of forming a proper oil-tight joint until the pressure on the lead rings has made them conform so closely to the size and shape of the piston-rod as to perform the same function thereafter. The spring presses the packing-rings apart as they wear away, and being pressed into the conical brass rings are always compressed properly upon the rod. When the rings B are first inserted, they close together, and are therefore formed with several small holes, f, to admit oil to the rod till the rings are forced apart again sufficiently to allow of the oil passing between them. The oil being at all times in the annular space e, and free of access to the rod, the latter is properly lubricated, while using no more oil than is necessary to perform its work properly. The piston moves always in oil, and the packing is self-adjusting, as shown.

Having thus fully described my invention, what I claim as new, and desire to secure by Letters Patent, is—

1. The combination, with a packing-box and its gland and a pair of brass rings therein, formed with conical inner sides, of a pair of packing-rings of soft metal, split upon one side, and having their outer sides conical to fit the brass rings, whereby, as the gland is forced in, the split conical packing-rings are closed upon the piston-rod, substantially as and for the purpose set forth.

2. The combination, with a packing-box and its gland, of a pair of soft-metal packing-rings split and having their adjoining ends shouldered or turned down and surrounded by a coiled spring and their opposite ends formed conical, and a pair of brass rings surrounding said conical ends and formed to fit the same, substantially as and for the purpose set forth.

3. The combination, with a packing-box and its gland, and an oil-cup secured on the side of the box and communicating with its interior, of a pair of soft-metal packing-rings split upon one side and having their opposite ends conical, a pair of brass rings with conical interiors fitting upon the same, a spiral spring placed between the packing-rings to force them apart, and a lead ring placed at each end of the box behind the packing-rings to form an oil-tight joint, substantially as and for the purpose set forth.

4. The packing-box A', gland A², and oil-cup E', in combination with the shouldered and split conical packing-rings B, the annular oil-space $e$, spring E, brass rings C, split lead rings $c$, and the rubber rings $c'$, all constructed and arranged to operate substantially as and for the purpose set forth.

In testimony whereof I affix my signature in presence of two witnesses.

GEORGE W. SCHEUING.

Witnesses:
W. C. McARTHUR,
CHAS. KRESSMANN.